(12) United States Patent
Ekstrom

(10) Patent No.: US 6,305,906 B1
(45) Date of Patent: Oct. 23, 2001

(54) DEVICE FOR ATTACHING PUMP IMPELLER

(75) Inventor: Anders Ekstrom, Taby (SE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/492,203

(22) Filed: Jan. 27, 2000

(30) Foreign Application Priority Data

Feb. 3, 1999 (SE) .................................................. 9900355-0

(51) Int. Cl.[7] .............................. F01D 5/00; F01D 25/00
(52) U.S. Cl. ................... 416/244 R; 416/204 R; 403/371
(58) Field of Search ........................... 416/244 R, 244 B, 416/171, 204 R; 415/216.1; 403/370, 369, 371

(56) References Cited

U.S. PATENT DOCUMENTS

| | | | |
|---|---|---|---|
| 3,904,301 | * | 9/1975 | Scroeder .......................... 416/244 R |
| 5,630,704 | * | 5/1997 | Gilgenbach et al. ............ 416/244 R |
| 5,961,247 | * | 10/1999 | Gold et al. ........................... 403/369 |
| 5,984,632 | * | 11/1999 | Lee et al. ......................... 416/244 R |

* cited by examiner

*Primary Examiner*—Edward K. Look
*Assistant Examiner*—Richard Woo
(74) *Attorney, Agent, or Firm*—Menotti J. Lombardi

(57) ABSTRACT

The invention concerns a device for attaching a pump impeller (5) onto a conical shaft end (7). A socket (8) provided with a slot is arranged on the shaft end (7), said socket having an outer diameter corresponding with the the shaft bore in the impeller (5). The socket (8) is provided with a threaded bore (9) for an adjusting screw (10) which, by help of a tool, can be turned thereby moving the impeller (5) axially on the shaft.

5 Claims, 5 Drawing Sheets

DEVICE FOR ATTACHING PUMP IMPELLER

Figure 1:
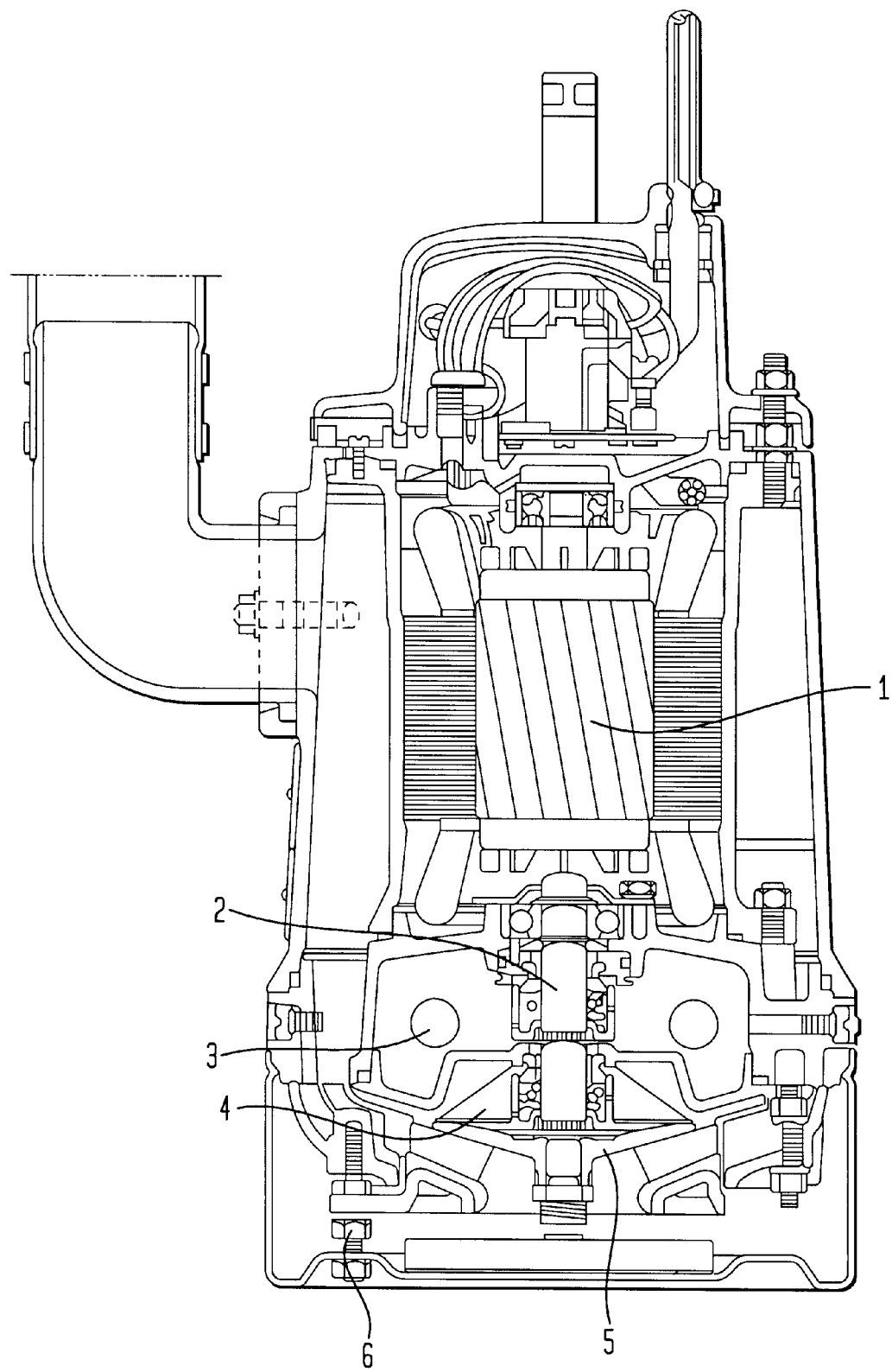

The invention concerns a device for attaching a detail onto a rotary shaft, namely a pump impeller onto a driving shaft with the possibility to slide the impeller along the shaft in order to obtain a suitable location relative a surrounding pump housing.

In a pump having a rotary pump impeller, such as a centrifugal—or an axial pump, the impeller must be attached rigidly and non-rotary to the driving shaft in a suitable way. A commonly used fixing means is a wedge joint which consists of a wedge which is brought into opposite grooves in the shaft and in the impeller respectively. Such a joint is often very suitable, but it lacks certain qualities which sometimes is a disadvantage. For instance it is often difficult to loosen the impeller from the shaft and replace it and It could also be difficult to adjust its axial position on the shaft.

In the following the technical field submersible pumps is dealt with, especially centrifugal pumps for pumping of heavily polluted liquids, and the specific problems which often occur here.

A submersible centrifugal pump comprises a driving unit such as an electric motor and a hydraulic unit including a pump housing with a rotary pump impeller connected to the electric motor via a driving shaft. A seal device is arranged in-between the motor and the pump housing to prevent liquid from penetrating the motor.

The location of the surrounding pump housing relative to the pump impeller is of course of great importance for obtaining a good pump result. This is valid for the axial as well as the radial location. When pumping liquids containing strongly abrasive particles, the impeller as well as other elements will be worn meaning that the initially correctly measured slots need to be adjusted at even intervals. As the pump impeller is rigidly attached to the shaft, an axial adjustment can only be obtained by help of an adjustable pump housing. In order to adjust the slot between the leading edge of the impeller and the bottom of the pump housing, the latter must be adapted to be possible to move in axial direction. In this way the radial slot can be controlled in relation to the wear of he surfaces. This adjustment, which is obtained by help of a number of axially directed screws, is however sometimes not exact enough and it has therefore been a wish to make an axial adjustment of the impeller possible.

According to the invention the problem mentioned above is solved by help of the device which is stated in the claims and disclosed in the drawings.

FIG. 1 shows a cut through a submersible centrifugal pump commonly used today, while FIGS. 2–5 show a device according to the invention at different phases of mounting.

In the drawings 1 stands for a driving unit, 2 a driving shaft, 3 a sealing unit, 4 a pump housing, 5 a pump impeller and 6 adjusting screws. 7 stands for the end part of the shaft 2, 8 a socket, 9 a threaded bore in the socket, 10 an adjusting screw and 12 a fastening screw. 12 stands for the leading edge of the pump impeller and 13 the bottom of the pump housing.

The submersible centrifugal pump shown in FIG. 1 includes a driving unit 1, a driving shaft 2, a seal unit 3, a pump housing 4 and a pump impeller 5. The bottom of the pump housing is adjustable relative to the impeller by help of adjusting screws 6.

The invention will now be described with reference to FIGS. 2 to 5. The driving shaft 2 is, according to a preferred embodiment, provided with a conical end 7. On said end a socket 8 is arranged, said socket being inwardly conical and outwardly cylindrical. The end of the socket 8 turned away from the conical end 7 is provided with a threaded bore for a central adjusting screw 10, the latter in its turn being provided with a through bore for a fastening screw 11 for the impeller.

Figure 2:
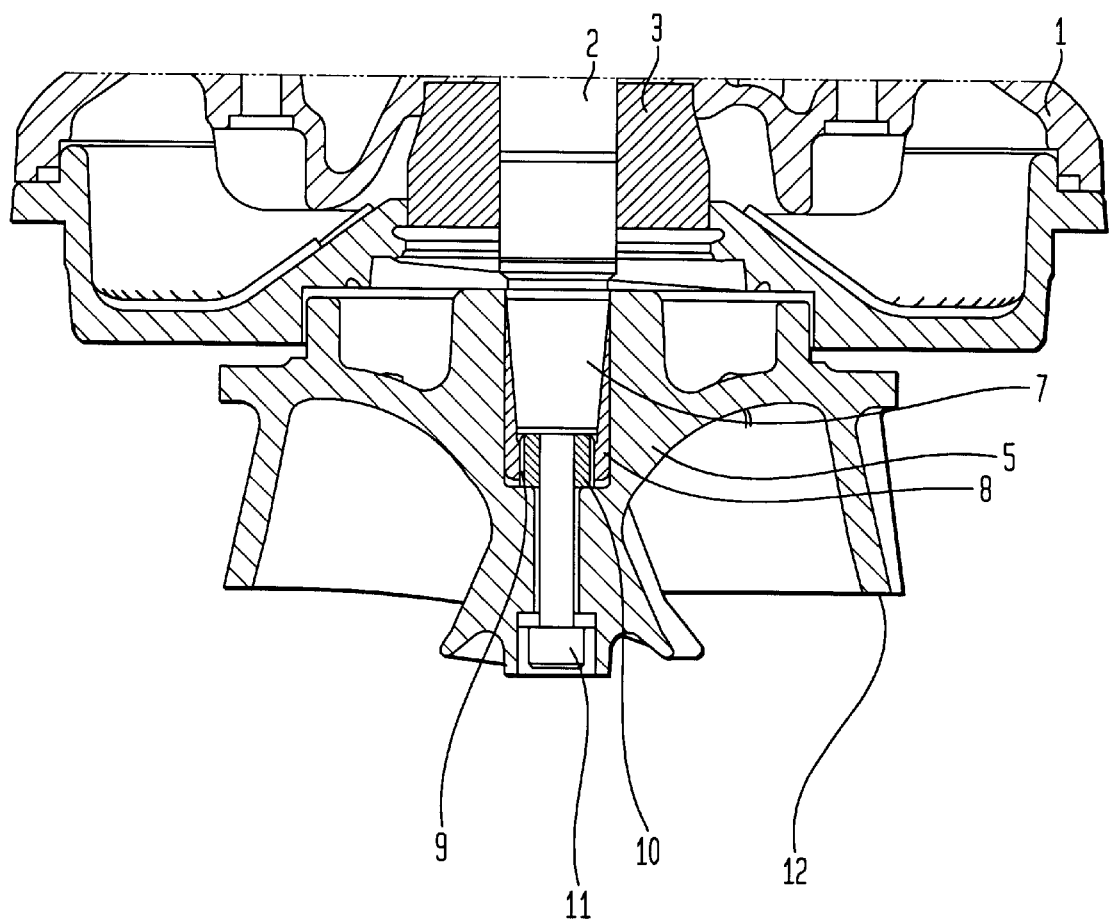

The mounting of the impeller takes place in the following way, see FIG. 2. The socket 8 is slid onto the end 7 and the adjusting screw 10 is screwed into the threaded bore 9 until it comes to alignment with the lower end surface of the socket. After that the pump impeller 5 is mounted on the socket 8 and the fastening screw 11 is screwed into a not-shown bore in the end 7 of the shaft. Said screw 11 is then only tightened so hard that the expansion of the socket 8, when pressed onto the conical end 7, is just enough to keep the pump impeller temporarily in place.

Figure 3:
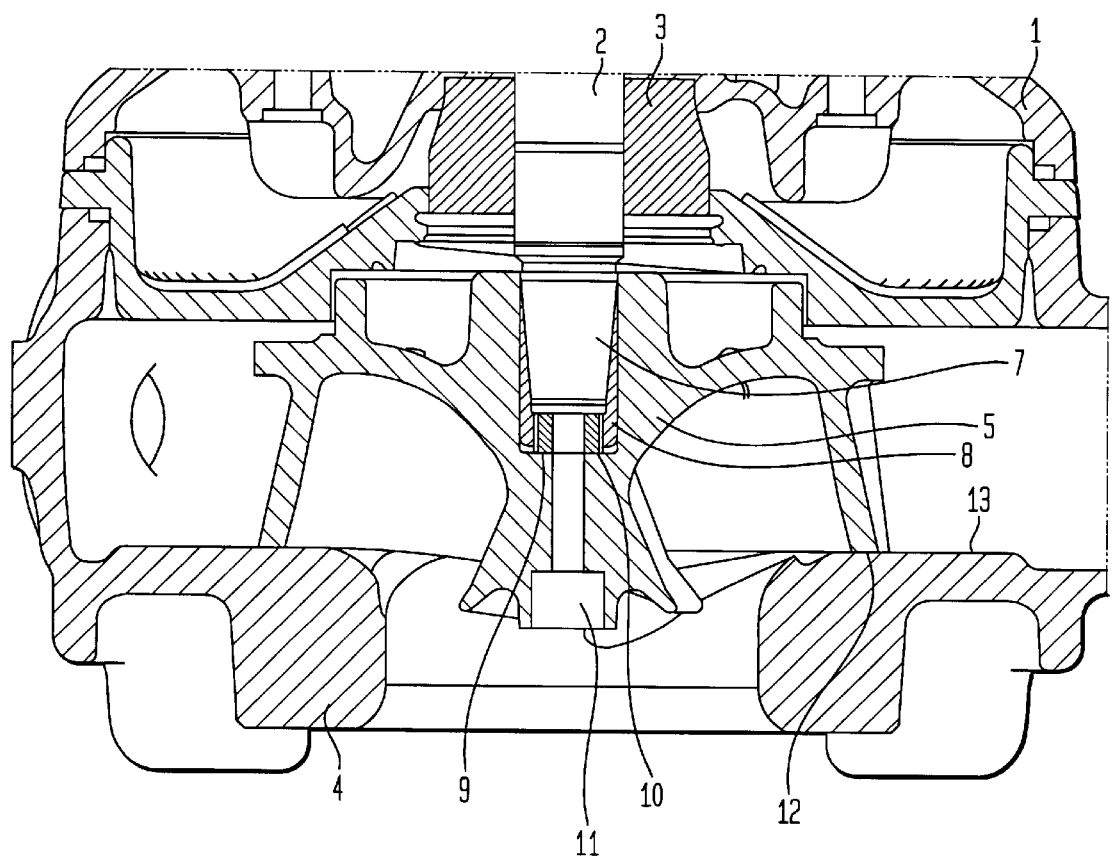

After that the pump housing 4 is mounted and is attached to the driving unit in the normal way, FIG. 3. A slot then occurs between the leading edge 12 of the impeller and the bottom 13 of the pump housing 4. The fastening screw 1 1 is unscrewed and gives room for a tool which is brought in through the shaft bore in the impeller and fits in into the adjusting screw 10. By help of this tool the adjusting screw is unscrewed to a certain degree, thereby pressing the pump impeller downwards into contact with the bottom 13 of the pump housing.

Figure 4:
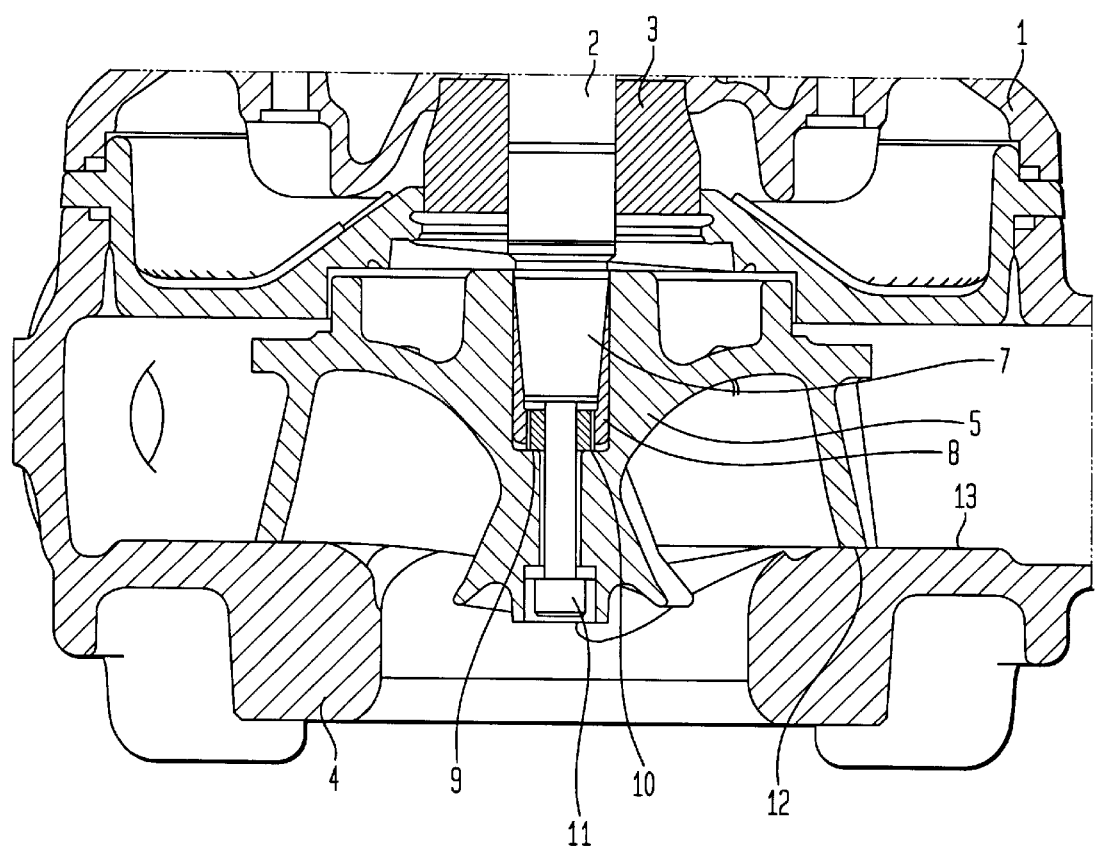

Next, FIG. 4, the tool is being replaced by the fastening screw 11 which Is tightened with a prescribed torque. The leading edges of the impeller will then loose its contact with the bottom of the pump housing and a very narrow and well defined slot is obtained. The mounting is now finished and the pump is ready for operation.

If wear of the leading edges of the impeller or the bottom of the pump housing should widen the slot between them too much, the fastening screw 11 is unscrewed and the above mentioned tool is used for turning the adjusting screw 10, causing the impeller to move axially downwards and thereby narrow the slot. The fastening screw is then tightened and the pump can once again operate at its optimum. The procedure can be repeated several times.

Figure 5:
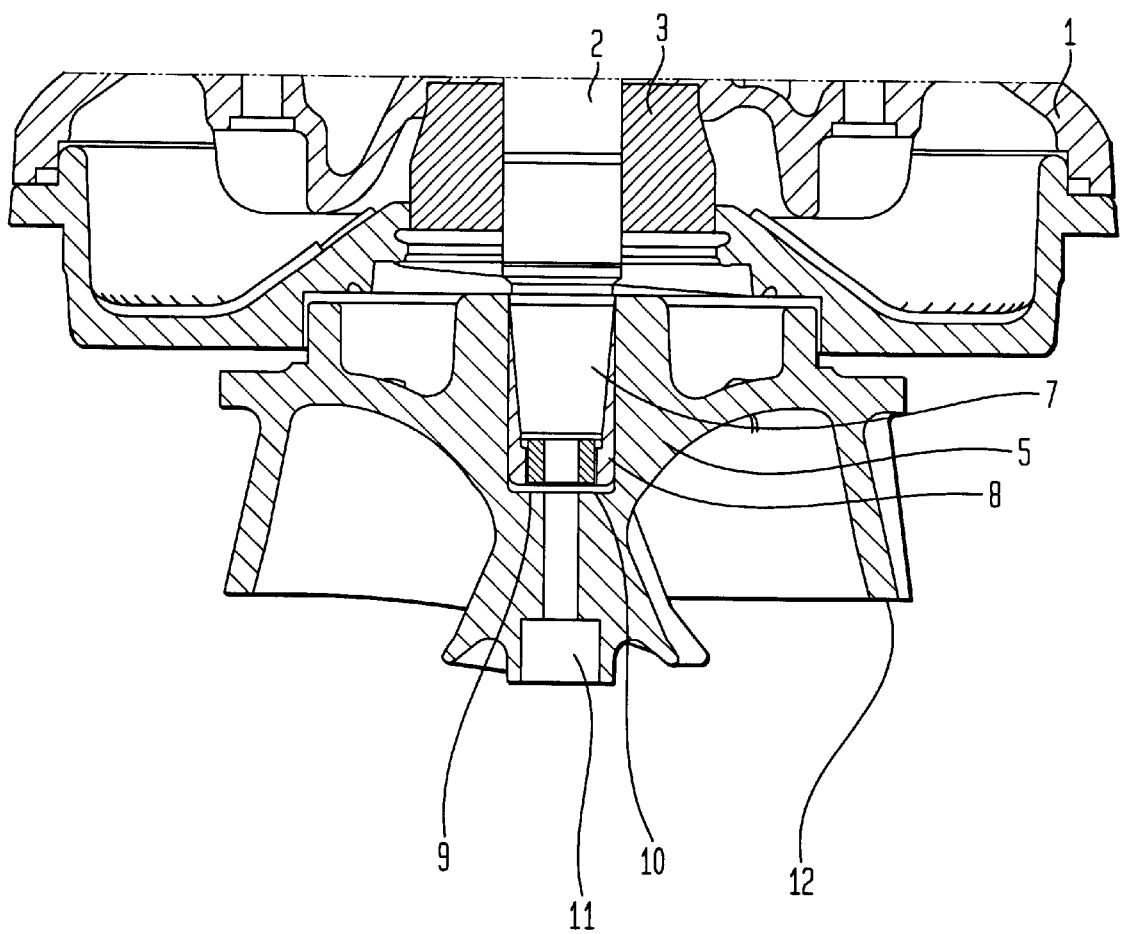

When demounting, FIG. 5, the same procedure is applied. The pump housing is first demounted and then the fastening screw 11 is unscrewed. The tool is mounted and the adjusting screw 10 is tightened towards the shaft end 7, thus pressing the impeller downwards till it comes lose.

According to the invention is obtained a device for a secure and well-defined fixing of a pump impeller on a shaft. The device also makes possible to obtain repeated adjustments of the impeller when necessary and a simple and secure demounting of the different details. The adjusting possibilities also decrease the manufacturing costs as the tolerance demands can be somewhat lower, without jeopardizing the performance of the pump.

The description above is dealing with the problem to attach a pump impeller to a driving shaft. The invention is however also possible to apply within other technical fields such as fan technology, where adjusting possibilities can be of great advantage.

What is claimed is:

1. A device for attaching a detail onto a rotary shaft, namely a centrifugal—or an axial pump impeller (5) to a driving shaft end (7), characterized in, that a socket (8), provided with a slot, is arranged on the shaft end (7), said socket having an outer diameter corresponding with the shaft bore in the impeller (5), that the socket (8) is provided with a threaded bore (9) for an adjusting screw (10) in its end turned away from the shaft end (7) and that the pump impeller (5) is provided with a central shoulder against which said adjusting screw (10) comes to contact when being unscrewed, and thereby moving the impeller relative to said shaft end.

2. A device according to claim 1, characterized in, that the shaft end (7) has a conical form and that the inside of the socket (8) has a conical form, while the outside has a cylindrical form.

3. A device according to claim 1, characterized in, that the shaft end (7) is provided with a threaded bore into which a fastening screw (11) can be driven for fastening of the impeller (5).

4. A device according to claim 1, characterized in, that the adjusting screw (10) is provided with a through bore for the fastening screw (11).

5. A device according to claim 1, characterized in, that the shaft end (7) has a surface against which the adjusting screw (10) comes into contact when it is screwed into the socket (8), thus loosening the socket and the impeller from said shaft end.

* * * * *